United States Patent
Ozan

(10) Patent No.: US 9,504,246 B2
(45) Date of Patent: Nov. 29, 2016

(54) TOOL FOR KILLING A SNAKE

(71) Applicant: Woodrow Ozan, Liberty, TX (US)

(72) Inventor: Woodrow Ozan, Liberty, TX (US)

(*) Notice: Subject to any disclaimer, the term of this patent is extended or adjusted under 35 U.S.C. 154(b) by 32 days.

(21) Appl. No.: 14/219,392

(22) Filed: Mar. 19, 2014

(65) Prior Publication Data

US 2015/0264916 A1 Sep. 24, 2015

(51) Int. Cl.
*A01M 31/00* (2006.01)
*B26B 1/08* (2006.01)

(52) U.S. Cl.
CPC ............. *A01M 31/00* (2013.01); *B26B 1/08* (2013.01)

(58) Field of Classification Search
CPC ...... A01M 27/00; A01K 81/04; A01K 81/06
USPC .................... 43/6, 77, 78, 79, 124
See application file for complete search history.

(56) References Cited

U.S. PATENT DOCUMENTS

| | | | | |
|---|---|---|---|---|
| 558,038 A * | 4/1896 | Carlsen | | 43/79 |
| 1,181,681 A * | 5/1916 | Nicaud | | B26B 29/02 30/151 |
| 1,269,413 A * | 6/1918 | Finnigan | | B25B 23/0021 112/80.03 |
| 2,512,237 A * | 6/1950 | Mravik | | A45D 29/20 132/76.2 |
| 4,002,366 A * | 1/1977 | Hammes | | F25C 5/043 294/26 |
| 4,043,067 A * | 8/1977 | Konucik | | A01K 81/00 294/61 |
| 4,183,570 A * | 1/1980 | Broyles | | E01H 1/12 294/61 |
| 4,192,066 A * | 3/1980 | Tucker | | F41B 13/00 30/162 |
| 4,393,587 A * | 7/1983 | Kloosterman | | B26B 1/08 30/162 |
| 5,600,914 A * | 2/1997 | Tatar | | A01K 97/00 30/125 |
| 6,021,572 A * | 2/2000 | Smith | | F41B 13/00 30/123 |
| 6,883,264 B1 * | 4/2005 | Gimbel | | A01K 81/04 43/6 |
| 2012/0246995 A1 * | 10/2012 | Moore, Jr. | | A01K 81/04 43/6 |

FOREIGN PATENT DOCUMENTS

CA 1106175 A1 * 8/1981 ............ A01M 23/24

* cited by examiner

*Primary Examiner* — Christopher P Ellis
*Assistant Examiner* — Michael Wang

(57) ABSTRACT

A snake killing tool includes an outer body and a handle extending into the outer body. The handle retains a blade member at its bottom end. The outer body defines a pair of tines arranged to grasp a snake. The blade member is arranged for sliding movement within the bottom end of the outer body down to abutting contact with the tines. The blade member may be deployed mechanically or manually in a downward direction to sever the head of a snake.

4 Claims, 1 Drawing Sheet

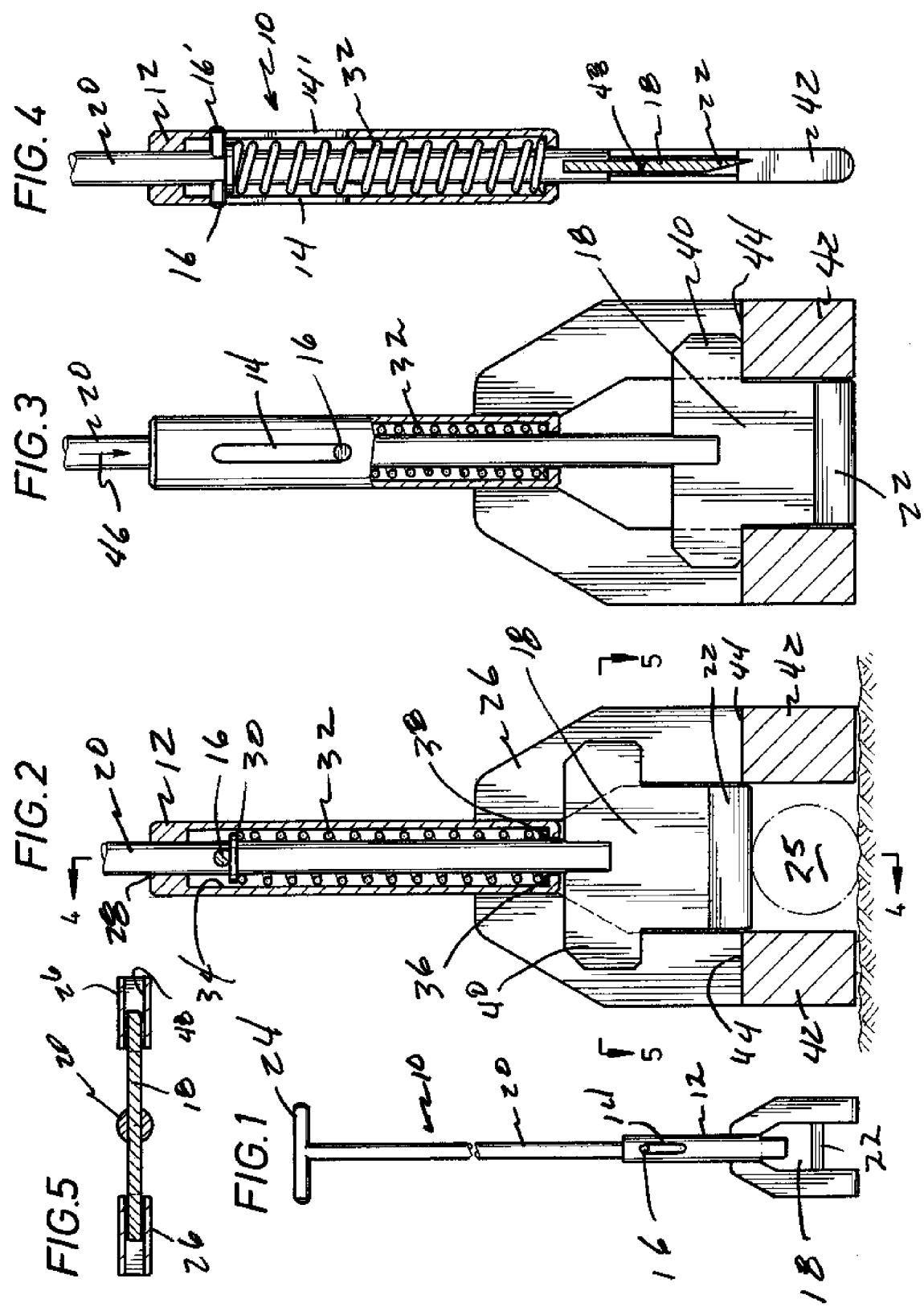

TOOL FOR KILLING A SNAKE

This application claims the benefit of U.S. Provisional Patent Application Ser. No. 61/803,224 filed Mar. 19, 2013.

FIELD OF THE INVENTION

The present invention relates generally to the field of tools for killing snakes, and, more particularly, to an elongate device arranged to sever the head from a dangerous snake from outside the striking range of the snake.

BACKGROUND OF THE INVENTION

The prior art teaches many devices for humanely capturing animals, including snakes. U.S. Pat. No. 6,684,562 titled "Snake Catcher" and the references cited therein are exemplary of the art. These devices all suffer from the same drawback in that when one is confronted with a poisonous snake, the first priority is to stop the poisonous snake before it bites the one confronted or his family and the humane treatment of the menace is secondary, at most.

Consequently, the present invention is directed a method and apparatus to stop and kill a poisonous snake and not to capture the snake.

SUMMARY OF THE INVENTION

The present invention solve these and other problems in the prior at by providing a fork at the end of an extended pole to retain a snake and a movable blade within the fork to sever the head of the snake once the snake is held fast. The blade may be advantageously operated with an elastic band. Alternatively, the blade may be hand-operated against the resistant force of a compressible spring, or it may be hand-operated without either the elastic band or the compressible spring.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 1 is a front view of a presently preferred hand-operated apparatus for holding and decapitating a snake.

FIG. 2 is a front detail view in partial section of a presently preferred embodiment of the apparatus of FIG. 1 in a retracted, quiescent position.

FIG. 3 a front view in partial section of the apparatus of FIG. 1 in an extended position, deployed position.

FIG. 4 is a side section view of the apparatus taken along section lines 4-4 of FIG. 2.

FIG. 5 is a top section view of the apparatus taken along section lines 5-5 of FIG. 2.

DETAILED DESCRIPTION OF A PREFERRED EMBODIMENT

FIG. 1 illustrates a tool 10 arranged for confronting, holding, and cutting the head off a snake. The tool comprises an outer body 12, preferably formed of an appropriate light-weight material such as PVC or other plastic although some other material may be used, including metal. An opening 14 is formed in the outer body 12 to receive a limiter post 16 which assists in limiting the travel of a blade member 18 as further described below.

The blade member 18 is coupled to or formed as an article of manufacture with a handle 20 which slides within the outer body 12. Sufficient clearance is provided between the blade member 18 and the outer body 12 so that the blade member moves within the outer body without binding or substantial friction. A blade 22 is formed on the bottom-most edge of the blade member 18. The blade member may be arranged for removal from the apparatus 10 so that it can be sharpened or replaced if damaged. The apparatus may also include a T-handle 24 to assist the user in applying greater downward thrust on the handle 20 in deploying the blade member 18.

FIG. 2 provides details of the outer body 12 and a lower end 26 of the apparatus 10. FIG. 2 also illustrates the positioning of the apparatus encountering a snake 25, shown in phantom. The handle 20 extends through an opening 28 at the top of the outer body 12. Inside the outer body, the limiter post 16 is joined to and extends horizontally from the handle 20. Below the limiter post 16 and in abutting contact with it is an annular grommet 30, preferably formed of metal. The grommet extends outwardly from the handle 20 enough to engage the top end of a compression spring 32, but no so far as to contact an inner surface 34 of the outer body. The bottom end of the compression spring rests on a shelf 36 inside the outer body 12.

The handle 20 extends through an opening 38 through the shelf 36. Below the opening 38, the handle joins to the blade member 18. The blade member 18 includes at least one and preferably a pair of opposing wings 40. The lower end 26 of the apparatus 10 includes a pair of tines 42 which are positioned on either side of the snake 25. Each tine defines an upper shoulder 44 which further serves to limit the downward travel of the blade member 18, as further shown in FIG. 3.

Referring now to FIG. 3, the apparatus of shown in an extended, i.e. deployed position. The handle 20 has been manually thrust downwardly as shown by an arrow 46. The limiter post 16, joined to the handle 20, has slid down within the opening 14 to its full extent. Also, the wings 40 have come into abutting contact with the shoulders 44, stopping the downward motion of the blade member 18. The downward movement of the blade has now severed the snake at the location of it body where the apparatus 10 was placed, preferably just below the snake's head. Notice also the compression spring 32 has been compressed, so that when downward pressure on the handle is release, the blade member 18 will retract in an upward direction.

Referring now to FIG. 4, a side view of the apparatus 10 is provided. The apparatus is illustrated in a retracted position. FIG. 4 illustrates that, in addition to the limiter post 16, an additional limiter post 16' may be provided, including an additional opening 14'. Also illustrated in FIG. 4, the blade member 18 rides within slots 48 in the lower end 26 of the outer body. The slots 48 provide sufficient clearance from the blade member so that the apparatus operates smoothly without binding.

Finally, FIG. 5 shows a top down view of the apparatus. The blade member 18 is coupled to the handle 20 and rides within the slots 48. The slots 48 extend through the lower end 26 of the outer body and terminate at the shoulders 44 at the top of the tines.

In operation, the handle is long enough so that the user can encounter a snake beyond the striking distance of the snake.

The tines are wide enough so that the positioning of the apparatus is easier. The apparatus should be positioned as near as possible just below the head of a snake. Then, the handle is thrust downwardly until the blade is stopped in its downward travel. The handle is then released and the blade retracts.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hand-held apparatus for holding and killing a snake comprising:
   a. an elongate handle having a guillotine member at one end, the guillotine member configured to remove the head of a snake;
   b. an outer body, wherein the handle extends laterally outside the outer body and into the outer body, the outer body defining a lower end enclosing the guillotine member, the outer body further defining a pair of downwardly extending tines adapted to extend either side of a snake and hold the snake in preparation for killing the snake;
   c. a lateral opening in the outer body;
   d. a lateral limiter post coupled to the handle and extending through the opening in the outer body to limit travel of the guillotine member so that the guillotine member cannot travel beyond the lower end of the outer body
   e. an annular grommet on the handle below the limiter post;
   f. a lower shelf in the outer body; and
   g. a compression spring between the annular grommet and the lower shelf arranged to resist downward motion of the handle and to automatically reset the blade upon completion of a downward stroke of the handle.

2. The apparatus of claim 1, further comprising:
   a. a shoulder on top of each of the pair of tines; and
   b. a pair of opposing wings extending from the guillotine member, each of the wings configured to come into abutting contact with a respective shoulder to limit travel of the guillotine member so that the guillotine member cannot travel beyond the lower end of the outer body.

3. The apparatus of claim 1, wherein the handle and outer body are co-axial along an axis, and wherein the guillotine member defines a cutting edge perpendicular to the axis.

4. A hand-held tool for confronting, holding, and cutting the head off a snake, the tool comprising:
   an outer body having an upper end and a lower end, the upper end defining an opening;
   a handle having an upper end and a lower end, the handle extending through the opening in the upper end of the outer body
   a limiter opening extending laterally through the outer body;
   a limiter post extending laterally from the handle into the limiter opening;
   a blade member at the lower end of the handle, the blade member defining a pair of downwardly extending tines and guillotine member between the tines;
   slots formed in the outer body to guide the blade member;
   an annular grommet on the handle below the limiter post;
   a lower shelf in the outer body; and
   a compression spring between the annular grommet and the lower shelf arranged to resist downward motion of the handle and to automatically reset the blade upon completion of a downward stroke of the handle.

* * * * *